United States Patent [19]

Peiffer et al.

[11] Patent Number: 5,468,527
[45] Date of Patent: Nov. 21, 1995

[54] TRANSPARENT, NON-HEAT-SEALABLE, ORIENTED, MULTILAYER POLYOLEFIN FILM, PROCESS FOR THE PRODUCTION THEREOF, AND THE USE THEREOF

[75] Inventors: Herbert Peiffer, Mainz; Ursula Murschall, Nierstein; Gunter Schloegl, Kelkheim, all of Germany

[73] Assignee: Hoechst Aktiengesellschaft, Frankfurt am Main, Germany

[21] Appl. No.: 200,169

[22] Filed: Feb. 23, 1994

[30] Foreign Application Priority Data

Feb. 27, 1993 [DE] Germany ............... 43 06 155.9

[51] Int. Cl.$^6$ ..................................... B29D 22/00
[52] U.S. Cl. .................. 428/35.7; 428/331; 428/349; 428/516; 428/910
[58] Field of Search ..................... 428/516, 910, 428/35.7, 331, 349; 156/244.11

[56] References Cited

U.S. PATENT DOCUMENTS

| | | | |
|---|---|---|---|
| 4,062,692 | 12/1977 | Hemmerich et al. | 106/300 |
| 4,533,509 | 8/1985 | Gust et al. | 264/171 |
| 4,622,237 | 11/1986 | Lori | 427/40 |
| 4,659,612 | 4/1987 | Balloni et al. | 428/213 |
| 4,698,261 | 10/1987 | Bothe et al. | 428/204 |
| 4,725,466 | 2/1988 | Crass et al. | 428/35 |
| 5,137,955 | 8/1992 | Tsuchiya et al. | 524/310 |
| 5,246,763 | 9/1993 | Murschall et al. | 428/195 |

FOREIGN PATENT DOCUMENTS

| | | |
|---|---|---|
| 0350168 | 1/1990 | European Pat. Off. |
| 0408971 | 1/1991 | European Pat. Off. |

OTHER PUBLICATIONS

Derwent Publications Ltd., AN 89–118948, JP 1–065175 abstract.
Derwent Publications Ltd., AN 88–045976, JP 3–030833 abstract.
Ullmanns Encyklopädie der technischen Chemie (Ullmann's Encyclopedia of Industrial Chemistry), 4th Edition, vol. 12, pp. 525–555.

*Primary Examiner*—Edith Buffalow
*Attorney, Agent, or Firm*—Foley & Lardner

[57] ABSTRACT

A transparent, non-heat-sealable, oriented, multilayer polyolefin film is described. It includes a base layer which contains polypropylene, and at least one non-heat-sealable outer layer. The non-heat-sealable outer layer contains from 0.1 to 0.6% by weight of $SiO_2$, based on the weight of the outer layer, which has been subjected to organic aftertreatment and has a mean particle diameter of from 2 to 6 µm, preferably from 4 to 5 µm. Also described are a process for the production of the multilayer film and the use thereof.

20 Claims, No Drawings

TRANSPARENT, NON-HEAT-SEALABLE, ORIENTED, MULTILAYER POLYOLEFIN FILM, PROCESS FOR THE PRODUCTION THEREOF, AND THE USE THEREOF

BACKGROUND OF THE INVENTION

1. Field of the Invention

The invention relates to a transparent, non-heat-sealable, oriented, multilayer polyolefin film comprising a base layer which comprises polypropylene, and at least one non-heat-sealable outer layer. The films are distinguished by excellent antistatic properties in combination with excellent processing properties and a low coefficient of friction.

2. Description of Related Art

Transparent, oriented polypropylene films are employed, for example, in gloss lamination with paper or board. The films are generally non-heat-sealable, since the lamination is carried out by adhesive bonding of film and the paper or cardboard.

This application makes high demands on the film's optical properties and processing properties. The optical properties of the film are primarily described by the surface gloss and the haze. The processing properties of friction, antistatic characteristics, abrasion behavior, thickness profile, winding properties and flat lying of the film are of great importance.

Films having a low coefficient of friction are known. The demands on the processing properties of the films and their smooth passage through automatic machines have continually increased over the years. For this reason, ever-lower coefficients of friction are required. Today, the adjective "low" describes friction values which cover an order of magnitude of 0.3 to 0.1, whereas a few years ago a friction of 0.4 to 0.5 was regarded as extremely "low".

EP-A-0 124 310 describes films having low coefficients of friction which comprise a thick base layer and a thin outer layer containing finely divided inorganic particles. Inorganic particles of $SiO_2$, aluminum silicates, sodium aluminum silicates and carbon black are disclosed. The particle size is in the range from 0.2 to 5.0 µm. The particles have an advantageous effect on the coefficient of friction of the film.

EP-A-0 350 168 describes a multilayer film having differentiated surface-slip characteristics of the two surfaces. The outer layers are heat-sealable and contain $SiO_2$ as antiblocking agent.

EP-A-0 234 758 describes a multilayer polyolefin film having a good absorption capacity for water-based coatings. The polypropylene outer layer contains an antiblocking agent and silicone oil. $SiO_2$, silicates, chalk, clay and the like are disclosed as suitable antiblocking agents. However, there is no detailed information on the particle size of the various antiblocking agents.

DE-A-35 17 795 describes multilayer polypropylene films whose outer layer contains a combination of amine, polydialkylsiloxane and a platelet type of an inorganic pigment. The film is distinguished by good antiblocking and surface-slip characteristics. The platelet type of pigment has a leaf type of structure. Suitable pigments are silicates and carbonates.

By applying the known teaching, it has been found that conventional $SiO_2$ in the production and further processing of the films results in deposits on the die lip and in considerable abrasion on the rolls over which the film passes during production and further processing. It has been found that this abrasion is caused by the $SiO_2$ present in the outer layers. This abrasion results in a number of problems. The die lip and the rolls must be cleaned frequently, since the film otherwise runs poorly during production. The deposits on the die lip result in streaking on the film, which impairs the film's appearance. In addition, these impurities cause problems during corona treatment. The corona treatment breaks through in the areas of the roll where $SiO_2$ abrasion has occurred and results in the undesired phenomenon known as the reverse-side effect. This reverse-side effect means that the reverse side of the film which has been corona or flame treated on one side also experiences treatment. These areas on the reverse side which have been unintentionally treated result in partial blocking and in adhesion of ink to the reverse side of the film in these areas during printing.

Furthermore, the films described in the prior art exhibit very poor roller make-up and do not lie flat. In addition, the antistatic properties are unsatisfactory.

SUMMARY OF THE INVENTION

The present invention thus has an object of providing a multilayer polyolefin, preferably polypropylene film which does not have the disadvantages of the films described in the related art above, particularly the occurrence of abrasion during production. Another object of the present invention is that the multilayer polyolefin film is suitable for further processing such as lamination. The film should have a low coefficient of friction, excellent antistatic properties and good roller make-up and flat lying. A further object of the present invention is that the film is printable on at least one side. Another object of the present invention is that these improvements should not impair the appearance of the film, i.e., the film should simultaneously have both very low haze and high gloss.

It is still another object of the present invention to provide a process for the production of the multilayer polyolefin film by a coextrusion process.

It is also another object of the present invention to provide a laminate made of the multilayer polyolefin film with paper and/or cardboard.

Still another object of the present invention is to use the multilayer or polyolefin film as a packaging film.

In accomplishing the foregoing objects, there has been provided according to the present invention a transparent, non-heat-sealable, oriented, multilayer polyolefin film comprising a base layer which comprises polypropylene, and at least one non-heat-sealable outer layer, wherein the non-heat-sealable outer layer contains from about 0.1 to 0.6% by weight of $SiO_2$, based on the weight of the outer layer, said $SiO_2$ having been subjected to organic aftertreatment and having a mean particle diameter from about 2 to 6 µm, preferably from about 2 to 5 µm, more preferably from about 4 to 5 µm, and even more preferably about 4 µm. Preferably, the $SiO_2$ has a carboxylic acid such as citric acid containing coating.

The present invention also provides a process for the production of the multilayer polyolefin film comprising the steps of coextruding melts corresponding to the individual layers of the film through a flat-film die, taking the coextruded film off over a take-off roll whose temperature is between about 80° and 110° C., biaxially stretching the film with a longitudinal stretching ratio of about 4:1 to 7:1 and a transverse stretching ratio of about 8:1 to 10:1, heat-setting the biaxially stretched film, and if desired corona treating the film followed by a subsequent winding up.

The present invention also provides a laminate comprising the multilayer polyolefin film and paper and/or cardboard.

The present invention also provides a method of using the multilayer polyolefin film as a packaging film or for further processing, preferably for printing and/or lamination.

DETAILED DESCRIPTION OF THE PREFERRED EMBODIMENTS

The present invention comprises a film of the generic type mentioned at the outset, wherein the non-heat-sealable outer layer contains from about 0.1 to 0.6% by weight of $SiO_2$, based on the weight of the outer layer, which has been subjected to organic aftertreatment coating and has a mean particle diameter of from about 2 to 6 µm, preferably from about 4 to 5 µm.

Surprisingly, the incorporation of $SiO_2$ having this particle size which has been subjected to organic aftertreatment into the homopolymer outer layer virtually unimpairs the excellent transparency of the film. It is known from the related art that the incorporation of particulate fillers into a homopolymer base layer during stretching results in the formation of vacuole-like cavities in the layer. The larger the particle size of the fillers, the larger the resultant vacuoles. These filler-containing films are virtually non-transparent due to the vacuoles and have a characteristic opaque appearance. It was therefore extremely surprising that the transparency of the films according to the present invention is virtually unimpaired, since a person skilled in the art would have expected the formation of vacuoles in the homopolymer outer layer owing to the $SiO_2$ and thus considerable hazing of the film. It has furthermore been found, entirely unexpectedly, that the film according to the present invention exhibits virtually no abrasion phenomena during production or further processing. Due to the large particle size, considerable abrasion problems would have been expected. Surprisingly, however, significantly less abrasion occurs.

The base layer of the multilayer film according to the invention essentially comprises a polypropylene polymer and, if desired, additives in effective amounts in each case. The polypropylene polymer comprises predominantly (at least about 90%) propylene and has a melting point of about 140° C. or above, preferably from about 150° to 170° C. Isotactic homopolypropylene having an n-heptane-soluble content of about 6% by weight or less, based on the isotactic homopolypropylene, copolymers of ethylene and propylene having an ethylene content of about 5% by weight or less, copolymers of propylene with $C_4$-$C_8$-α-olefins having an α-olefin content of about 5% by weight or less are preferred polypropylene polymers for the base layer, particular preference being given to isotactic polypropylene. The polypropylene polymer of the base layer generally has a melt flow index of from about 0.5 g/10 min to 10 g/10 min, preferably from about 1.5 g/10 min to 4 g/10 min, at about 230° C. and a force of about 21.6N (DIN 53 735). The percentages by weight given relate to the particular copolymer.

For the purposes of the present invention, non-heat-sealable polyolefin polymers are defined as homopolymers of propylene and mixtures of these homopolymers. The polypropylene polymer comprises predominantly (at least about 90%) propylene and has a melting point of about 140° C. or above, preferably from about 150° to about 170° C. Isotactic homopolypropylene having an n-heptane-soluble content of about 6% by weight or less, based on the isotactic homopolypropylene, copolymers of ethylene and propylene having an ethylene content of about 5% by weight or less, copolymers of propylene with $C_4$-$C_8$-α-olefins having an α-olefin content of about 5% by weight or less are preferred polypropylene polymers for the non-heat-sealable outer layer, particular preference being given to isotactic polypropylene. The polypropylene polymer of the base layer generally has a melt flow index of from about 0.5 g/10 min to 10 g/10 min, preferably from about 1.5 g/10 min to 4 g/10 min, at about 230° C. and a force of about 21.6N (DIN 53 735). The percentages by weight given relate to the particular copolymer.

The multilayer film according to the invention comprises at least the above-described base layer and at least one outer layer essentially comprising the above-described non-heat-sealable polypropylene polymers or mixtures thereof. In a preferred embodiment, the outer layer comprises one of the above-mentioned homopolymers or mixtures thereof. Depending on its intended application, the multilayer film may have a further outer layer on the opposite side. In a further preferred embodiment, the multilayer film has three layers with identical or different outer layers.

The thickness of the non-heat-sealable outer layer(s) is greater than about 0.1 µm and is preferably in the range from about 0.3 to 2 µm, in particular from about 0.4 to 1.5 µm, where outer layers on both sides may have the same or different thicknesses.

The overall thickness of the multilayer polyolefin film according to the invention can vary within broad limits and depends on the intended application. It is preferably from about 5 to 100 µm, in particular from about 10 to 60 µm, the base layer making up from about 60 to 97% of the overall film thickness.

The outer layer contains from about 0.1 to 0.6% by weight of $SiO_2$, based on the weight of the outer layer, which has been subjected to organic aftertreatment coating and has a mean particle diameter from about 2 to 6 µm. $SiO_2$ is generally prepared by grinding silica gel and is a synthetic, highly porous, pure silicic acid which has a completely amorphous structure, in contrast to crystalline silicic acids. The $SiO_2$ content is generally greater than about 95%, in particular in the range from about 98 to 99.5%. According to the invention, the $SiO_2$ particles have been subjected to organic aftertreatment coating and have a coating containing from about 0.5 to 5% by weight of an aliphatic carboxylic acid. Preferred aliphatic carboxylic acids are aliphatic hydroxydi- and -tricarboxylic acids or stearic acid. In general, the acids contain two to five, preferably two to three, hydroxyl groups. Preferred aliphatic carboxylic acids are tartronic acid (hydroxymalonic acid), malic acid (monohydroxysuccinic acid), tartaric acid (dihydroxysuccinic acid) and citric acid. Coatings containing citric acid have proven particularly advantageous. Due to the organic coating, the $SiO_2$ particles are slightly acidic in aqueous solutions. The pH of about a 5% strength aqueous suspension is in the range from about 3 to 5, and is preferably 4.

Surprisingly, $SiO_2$-containing films which satisfy the above-mentioned conditions have excellent antistatic properties and very good antiblocking and abrasion behavior in addition to a particularly good coefficient of friction. It has been found that the amounts in which antistatics are usually added can be greatly reduced. Likewise, very surprisingly, it has been found that the transparency of the films is virtually unimpaired, in spite of the large particle size of the $SiO_2$.

In order to achieve these improvements, it is essential to use an $SiO_2$ having a particle size in the range of about 2 to 6 µm which has been subjected to organic aftertreatment.

These measures furthermore allowed the abrasion on the rolls during the production process to be drastically reduced. Additional purification measures, which appreciably increase the production costs, are therefore no longer necessary. Reverse-side effects during corona treatment are virtually non-existent.

In a further embodiment, in addition to this selected outer layer additive, the multilayer film according to the invention may additionally contain neutralizers, stabilizers, lubricants, low-molecular-weight resins and antistatics.

Neutralizers are preferably calcium stearate and/or calcium carbonate having a mean particle size of at most about 0.7 μm, an absolute particle size of less than about 10 μm and a specific surface area of at least about 40 m²/g.

Stabilizers which can be employed are conventional stabilizing compounds for polymers of ethylene, propylene and other α-olefins. The amount in which they are added is between about 0.05 and 2% by weight. Particularly suitable are phenolic stabilizers, alkali/alkaline earth metal stearates and/or alkali/alkaline earth metal carbonates.

Phenolic stabilizers are preferred in an amount from about 0.1 to 0.6% by weight, in particular from about 0.15 to 0.3% by weight, and having a molecular weight of greater than about 500 g/mol. Pentaerythrityl tetrakis [3-(3,5-di-tert-butyl-4-hydroxyphenyl)propionate and 1,3,5-trimethyl-2,4, 6-tris(3,5-di-tert-butyl-4-hydroxybenzyl)benzene are particularly advantageous.

Lubricants are higher aliphatic acid amides, higher aliphatic acid esters, waxes and metal soaps, and polydimethylsiloxanes. The effective amount of lubricant is in the range from about 0.03 to 3% by weight. The addition of higher aliphatic acid amides in the range from about 0.1 to 0.4% by weight to the base layer and/or the outer layers is particularly suitable. A particularly suitable aliphatic acid amide is erucamide.

The addition of polydimethylsiloxanes is preferred in the range from about 0.1 to 2.0% by weight, in particular polydimethylsiloxanes having a viscosity of about 10,000 to 1,000,000 mm²/s.

The low-molecular-weight resin recommended is a natural or synthetic resin having a softening point from about 60° to 180° C., preferably from about 80° to 150° C., determined in accordance with ASTM E-28. The term "low-molecular weight" indicates a molecular weight that is significantly lower than that of the film forming propylene polymers which usually have a molecular weight of more than 100,000. Generally the resins have a molecular weight of about 300 to about 8,000, preferably of about 400 to 5,000 and most preferred of about 500 to 2,000. Of the numerous low-molecular-weight resins, preference is given to hydrocarbon resins, specifically in the form of petroleum resins, styrene resins, cyclopentadiene resins and terpene resins (these resins are described in Ullmanns Encyklopädie der technischen Chemie [Ullmann's Encyclopedia of Industrial Chemistry], 4th Edition, Volume 12, pages 525 to 555). The effective amount of low-molecular-weight resin is from about 0.2 to 15% by weight, preferably from about 0.5 to 10% by weight, based on the layer. Suitable petroleum resins are described in numerous specifications, such as EP-A-0 180 087, which reference is expressly incorporated herein in its entirety.

Preferred antistatics are alkali metal alkanesulfonates, polyether-modified, i.e., ethoxylated and/or propoxylated, polydiorganosiloxanes (polydialkylsiloxanes, polyalkylphenylsiloxanes and the like) and/or the essentially straight-chain and saturated aliphatic, tertiary amines containing an aliphatic radical having 10 to 20 carbon atoms which are substituted by ω-hydroxy-($C_1$-$C_4$)-alkyl groups, N,N-bis(2-hydroxyethyl)alkylamines having 10 to 20 carbon atoms, preferably 12 to 18 carbon atoms, in the alkyl radical being particularly suitable. The effective amount of antistatic is in the range from about 0.05 to 3% by weight. A further preferred antistatic is glycerol monostearate.

The invention furthermore relates to a process for the production of the multilayer film according to the invention by the coextrusion process known per se. This process is carried out by coextruding the melts corresponding to the individual layers of the film through a flat-film die, taking the resultant film off over one or more rolls for solidification, subsequently stretching (orienting) the film biaxially, heat-setting the biaxially stretched film and, if desired, corona- or flame treating it on the surface layer intended for the treatment.

The biaxial stretching (orientation) can be carried out simultaneously or consecutively, preference being given to consecutive biaxial stretching in which the stretching is first carried out longitudinally (in the machine direction) and then transversely (perpendicular to the machine direction).

As is conventional in the coextrusion process, the polymer or polymer mixture of the individual layers is first compressed and liquefied in an extruder, with it being possible for any additives already to be present in the polymer or in the polymer mixture. The melts are then simultaneously forced through a flat-film die, and the extruded multilayer film is taken off over one or more take-off rolls, during which it cools and solidifies.

The resultant film is then stretched longitudinally and transversely to the extrusion direction, which results in orientation of the molecular chains. The stretching is preferably from about 4:1 to 7:1 in the longitudinal direction and from about 7:1 to 10:1 in the transverse direction. The longitudinal stretching is expediently carried out with the aid of two rolls rotating at different speeds corresponding to the desired stretching ratio, and the transverse stretching is carried out with the aid of an appropriate tenter frame.

The biaxial stretching of the film is followed by heat setting, during which the film is kept at a temperature from about 140° to 160° C. for from about 0.1 to 10 seconds. The film is subsequently wound up in a conventional manner using a wind-up unit.

It has proven particularly favorable to keep the take-off roll or rolls, which also cool and solidify the extruded film, at a temperature from about 20° to 110° C.

The temperatures at which longitudinal and transverse stretching are carried out can vary. In general, the longitudinal stretching is preferably carried out at about 120° to 150° C. and the transverse stretching at from about 150° to 180° C.

As mentioned above, one or both surfaces of the film can, if desired, be corona or flame treated by one of the known methods after the biaxial stretching.

In the case of corona treatment, it is expedient to pass the film between two conductor elements serving as electrodes, with such high voltage, usually an alternating voltage (for instance from 10 to 20 kV and from 20 to 40 Khz) being applied between the electrodes so that spray or corona discharges can occur. The spray or corona discharge ionizes the air above the film surface, causing it to react with the molecules of the film surface, so that polar inclusions are formed in the essentially non-polar polymer matrix.

For flame treatment with a polarized flame (see U.S. Pat.

No. 4,622,237), a direct electrical voltage is applied between a burner (negative pole) and a chill roll. The level of the applied voltage is between about 500 and 3000 V, preferably in the range from about 1000 to 2000 V. Due to the applied voltage, the ionized atoms accelerate and hit the polymer surface with greater kinetic energy. The chemical bonds within the polymer molecule are easier to break, and free-radical formation proceeds more quickly. The thermal load on the polymer during this process is significantly less than in the case of standard flame treatment. In addition, a film of this type is more suitable for winding up than is the case in standard flame treatment.

The film according to the invention is distinguished by a very low coefficient of friction (from about 0.1 to 0.3) in combination with good antistatic properties. The surface resistance is generally less than about $10^{13}$ Ω and is preferably in the range from $10^{11}$ to $10^{12}$ Ω. The film is not inferior to known films in gloss and haze. The haze, measured in accordance with ASTM-D 1003-52, is less than about 2%, preferably in the range from about 0.5 to 2%, in particular in the range from about 1.0 to 1.8%. The gloss values (DIN 67530) are generally at least about 110, preferably from about 120 to 140, in particular from about 125 to 135. The film is simultaneously very suitable for conversion and consequently exhibits excellent roller make-up and excellent flat lying.

The film exhibits virtually no tendency toward blocking, and virtually no reverse-side effects occur.

It has been found that $SiO_2$ particles having a mean particle diameter of about 2 μm which have not been subjected to organic aftertreatment coating do not give the desired property profile of the film. In particular, considerable abrasion, reverse-side effect and considerable blocking at certain points occur. Surprisingly, it has been possible to solve these problems by selecting a particle diameter of from about 2 to 6 μm in combination with organic aftertreatment coating of the particles, without significantly impairing the transparency of the film owing to vacuole formation and without significantly impairing its gloss.

The invention is now described in greater detail with reference to working examples.

EXAMPLE 1

A three-layer film having an overall thickness of 12 μm and an ABA layer structure, i.e., the base layer B was surrounded by two identical outer layers A, was produced by coextrusion and subsequent stepwise orientation in the longitudinal and transverse directions.

The film was subjected to corona treatment on one side before winding up. The surface tension on this side as a consequence of this treatment was 40 mN/m. All layers contained 0.13% by weight of pentaerythrityl tetrakis[4-(3,5-di-tert-butyl-4-hydroxyphenyl)propionate](Irganox® 1010) as stabilizer and 0.06% by weight of calcium stearate as neutralizer.

The base layer B essentially comprised a polypropylene homopolymer having an n-heptane-soluble content of 4% by weight and a melting point of 160° C. The melt flow index of the polypropylene homopolymer was 3.4 g/10 min at 230° C. and a load of 21.6N (DIN 53 735). The base layer contained 0.15% by weight of erucamide with a melting point of from 78° to 82° C.

The polyolefinic outer layers A essentially comprised a random propylene homopolymer having an n-heptane-soluble content of 4.0% by weight and a melting point of 60° C. The melt flow index of the homopolymer was 3.6 g/10 min (DIN 53 735). The outer layers contained 0.3% by weight of a silicon dioxide having a mean particle diameter of 4 μm which had been subjected to organic aftertreatment coating with citric acid, and 0.3% by weight of polydialkylsiloxane having a viscosity of 50,000 cSt. Each of the outer layers had a thickness of 0.5 μm.

EXAMPLE 2

Example 1 was repeated, but both sides were now corona treated. The pretreatment intensity was 39 mN/m.

EXAMPLE 3

Example 1 was repeated, but the base layer now contained no erucamide. Instead, each outer layer now contained 0.5% by weight of polydialkylsiloxane having a viscosity as in Example 1.

EXAMPLE 4

Example 1 was repeated, but the particle diameter of the $SiO_2$ was now 5 μm.

Comparative Example 1

Example 1 was repeated, but the $SiO_2$ had not been subjected to organic aftertreatment coating.

Comparative Example 2

Example 1 was repeated, but the $SiO_2$ has not been subjected to organic aftertreatment coating and had a particle diameter of 2 μm.

Comparative Example 3

Example 1 was repeated, but the particle diameter was now 7 μm.

Comparative Example 4

Example 1 was repeated, but the particle diameter was now 7 μm. The $SiO_2$ had not been subjected to organic aftertreatment coating.

The properties of the films in the examples and comparative examples are shown in the table.

In order to characterize the raw materials and the films, the following measurement methods were used:

Melt flow index

The melt flow index was measured in accordance with DIN 53 735 at a load of 21.6N and at 230° C. or at a load of 50N and at 190° C.

Melting point

DSC measurement, maximum of the melting curve, heating rate 20° C./min.

Friction

The friction was determined in accordance with DIN 53 375.

Surface tension

The surface tension was determined by the ink method (DIN 53 364).

Surface resistance

The surface resistance was measured in accordance with DIN 53 482.

Antistatic charging

The antistatic charging was determined in accordance with DIN/draft 57 303, Part 14.

Film abrasion

In order to determine the film abrasion, the film is passed over a steel pin for 10 minutes. The abrasion formed on the steel pin can be determined qualitatively and quantitatively.

Evidence of organic coating

An organic aftertreatment coating of the $SiO_2$ particles can be detected by RMA. To this end, the film surface is etched with oxygen for 15 minutes, so that the $SiO_2$ particles present in the film are exposed. An ESCA measurement is carried out on these $SiO_2$ particles uncovered by etching. Organically coated $SiO_2$ particles have a carbon and oxygen peak in the ESCA spectrum; this is not found in the uncoated particles.

TABLE

| Examples | Gloss DIN 67530 | Haze ASTM D 1003-52 % | Friction 14 days after production Side A/ side D | Antistatic properties Surface resistance/charging E | Film abrasion | Roller make-up Flat lying | RSE | Blocking |
|---|---|---|---|---|---|---|---|---|
| E1 | 130 | 1.6 | 0.23/0.25 | $4 \cdot 10^{12}$ Ω/60 kV/m | None | Good | None | None |
| E2 | 130 | 1.6 | 0.25/0.25 | $1 \cdot 10^{12}$ Ω/50 kV/m | None | Good | — | None |
| E3 | 130 | 1.6 | 0.27/0.27 | $4 \cdot 10^{12}$ Ω/60 kV/m | None | Good | None | None |
| E4 | 125 | 1.7 | 0.20/0.23 | $6 \cdot 10^{11}$ Ω/40 kV/m | None | Very good | None | None |
| CE1 | 130 | 1.6 | 0.23/0.25 | $5 \cdot 10^{12}$ Ω/40 kV/m | Considerable | Satisfactory | Considerable | None |
| CE2 | 130 | 1.6 | 0.25/0.27 | $3 \cdot 10^{13}$ Ω/120 kV/m | Very Considerable | Unsatisfactory | Considerable | None |
| CE3 | 80 | 6.0 | 0.25/0.27 | $8 \cdot 11^{12}$ Ω/50 kV/m | None | Good | None | None |
| CE4 | 80 | 6.0 | 0.25/0.27 | $8 \cdot 11^{12}$ Ω/50 kV/.m | Very considerable | Good/ satisfactory | Very considerable | None |

B = Example
CE = Comparative example

What is claimed is:

1. A transparent, non-heat-sealable, oriented, multilayer polyolefin film comprising a base layer which comprises polypropylene, and at least one non-heat-sealable outer layer, wherein the non-heat-sealable outer layer contains from about 0.1 to 0.6% by weight of $SiO_2$, based on the weight of the outer layer, said $SiO_2$ having been subjected to organic aftertreatment coating and having a mean particle diameter from 2 to 6 μm.

2. A multilayer polyolefin film as claimed in claim 1, wherein in the $SiO_2$ has a mean particle diameter from about 4 to 5 μm.

3. A multilayer polyolefin film as claimed in claim 1, wherein the $SiO_2$ has a carboxylic acid-containing coating.

4. A multilayer polyolefin film as claimed in claim 1, wherein the $SiO_2$ has a citric acid-containing coating.

5. A multilayer polyolefin film as claimed in claim 1, wherein the $SiO_2$ has a mean particle diameter from 2 to 5 μm.

6. A multilayer polyolefin film as claimed in claim 5, wherein the $SiO_2$ has a mean particle diameter from about 4 μm.

7. A multilayer polyolefin film as claimed in claim 3, wherein the carboxylic acid is an aliphatic carboxylic acid.

8. A multilayer polyolefin film as claimed in claim 7, wherein the aliphatic carboxylic acid is selected from the group consisting of hydroxydicarboxylic acids, tricarboxylic acids, stearic acid, carboxylic acids containing 2–5 hydroxyls or carboxylic acids containing 2–3 hydroxyls.

9. A multilayer polyolefin film as claimed in claim 8, wherein the aliphatic carboxylic acid is a carboxylic acid containing 2–3 hydroxyls.

10. A multilayer polyolefin film as claimed in claim 3, wherein the carboxylic acid is selected from the group consisting of tartronic acid, malic acid or tartaric acid.

11. A multilayer polyolefin as claimed in claim 3, wherein the carboxylic acid is tartronic acid.

12. A multilayer polyolefin as claimed in claim 3, wherein the carboxylic acid is malic acid.

13. A multilayer polyolefin as claimed in claim 3, wherein the carboxylic acid is tartaric acid.

14. A process for the production of the multilayer polyolefin film containing from about 0.1 to 0.6% by weight of organic aftertreatment coated $SiO_2$ having a mean particle diameter from 2 to 6 μm in said at least one non-heat-sealable outer layer, as claimed in claim 1, comprising the steps of coextruding melts corresponding to the individual layers of the film through a flat-film die, taking the coextruded film off over a take-off roll whose temperature is between about 80° and 110° C., biaxially stretching the film with a longitudinal stretching ratio of about 4:1 to 7:1 and a transverse stretching ratio of about 8:1 to 10:1, and heat-setting the biaxially stretched film.

15. A process as claimed in claim 14, further comprising the steps of corona treating the heat-set film.

16. A process as claimed in claim 14, further comprising the steps of winding up the heat-set film.

17. A laminate comprising the multilayer polyolefin film as claimed in claim 1, applied to a substrate comprising a cellulose based sheet.

18. A packaged article comprising the multilayer polyolefin film as claimed in claim 1 as a packaging film surrounding at least in part an article.

19. A method of using the multilayer polyolefin film as claimed in claim 1, comprising the step of further processing the multilayer film.

20. A method of using the multilayer polyolefin film as claimed in claim 19, wherein the further processing is printing and/or lamination.

* * * * *